US007665546B2

(12) United States Patent
Ruttley

(10) Patent No.: US 7,665,546 B2
(45) Date of Patent: *Feb. 23, 2010

(54) METAL DEBRIS CLEANOUT SYSTEM AND METHOD

(75) Inventor: David J. Ruttley, Marrero, LA (US)

(73) Assignee: Rattler Tools, Inc., Harvey, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/008,637

(22) Filed: Jan. 14, 2008

(65) Prior Publication Data

US 2008/0128347 A1 Jun. 5, 2008

Related U.S. Application Data

(63) Continuation of application No. 11/166,312, filed on Jun. 24, 2005, now Pat. No. 7,410,014.

(51) Int. Cl.
*E21B 21/01* (2006.01)
*B01D 35/06* (2006.01)

(52) U.S. Cl. ........................ 175/206; 175/207; 166/265; 210/695; 210/804; 210/222; 210/223

(58) Field of Classification Search .................. 175/66, 175/312, 206, 207; 166/264, 265, 85.2, 170; 210/222, 223, 695, 804
See application file for complete search history.

(56) References Cited

U.S. PATENT DOCUMENTS

| | | | | |
|---|---|---|---|---|
| 4,299,700 | A | 11/1981 | Sanderson | |
| 6,264,842 | B1 | 7/2001 | Boehm | |
| 6,453,738 | B1 * | 9/2002 | Cesmat et al. | 73/152.18 |
| 6,702,940 | B2 | 3/2004 | Blange | |

* cited by examiner

*Primary Examiner*—David J Bagnell
*Assistant Examiner*—Brad Harcourt
(74) *Attorney, Agent, or Firm*—Law Office of Jesse D. Lambert, L.L.C.

(57) ABSTRACT

A cleanout system and method for removal of metal debris from a fluid flow, such a flow of re-circulated drilling mud employs one or more magnetic unit positioned in the path of the fluid for collecting metal particles from the flow. The magnetic unit has a removable magnet core positioned in a non-magnetic sleeve. When the core is removed from the sleeve the attracted metal particles are allowed to drop from the sleeve under gravity to facilitate their collection and disposal. A fluid deflector is positioned upstream from each magnetic unit, protecting the magnetic unit from direct impact by the strong flow. The magnetic units are allowed to pivot from side-to-side and adjust their position in the flow.

11 Claims, 6 Drawing Sheets

METAL DEBRIS CLEANOUT SYSTEM AND METHOD

CROSS-REFERENCE TO RELATED APPLICATIONS

This application is a continuation of my application Ser. No. 11/166,312 filed on Jun. 24, 2005 entitled "Metal Debris Cleanout System and Method," now U.S. Pat. No. 7,410,014, the full disclosure of which is incorporated by reference herein and priority of which is hereby claimed.

BACKGROUND OF THE INVENTION

The present invention relates to a system and method for removal of metal debris from a normal path of a fluid flow, such as the flow of re-circulated fluid generated during drilling/completion operations.

The drilling or completion operation results in metal debris generated in the well bore. The debris is suspended in the highly viscous drilling fluid or other re-circulated fluid and must be periodically removed from the well bore in order to improve the well production and avoid damage to equipment operating within the well bore, such as pumps and the like. The drilling fluid carries with it pieces of metallic shavings that are particularly dangerous for the operation of equipment during completion and production operations.

Conventionally, the drilling fluid is pumped to the surface, cleaned and recirculated back into the well bore. Shale shakers and similar equipment is often used to remove chunks of formation, metal pieces and other such objects. The drilling fluid is then delivered to a mud pit, flowing along a ditch, which may be 100 feet long. The mud pit allows the smaller particles to settle on the bottom, while the drilling fluid, now relatively free of debris, is pumped back to the rig floor by pumps.

In order to solve the metal debris problem, the conventional technique provides for the use of various magnets in the ditch for intercepting the flow of fluid through the ditch and capturing as many metal objects as possible. However, the collection magnets are difficult to retain in the viscous fluid flow, and the metal collected on the magnets is difficult to remove.

The present invention contemplates elimination of drawbacks associated with the prior art and provision of a metal debris cleanout system, tool and method that can be used for removal of metal debris from the drill mud and other similar re-circulating fluids.

SUMMARY OF THE INVENTION

It is, therefore, an object of the present invention to provide a metal debris cleanout system that allows entrapment of metal debris in the circulation fluids before the re-circulated fluids are returned to a well bore.

It is another object of the present invention to provide a metal debris cleanout method for capturing metal debris in the flow of re-circulating flow.

These and other objects of the present invention are achieved through a provision of a system for removing metal debris from a fluid flow, which comprises at least one magnetic unit comprising a hollow sleeve and a removable magnetic core positioned in the sleeve. The magnetic unit is placed in the normal path of the fluid flow, such that the fluid contacts the sleeve and the metal debris settles on the exterior of the sleeve. Once the operator detects sufficient accumulation of the metal particles on the sleeve, the operator removes the magnetic unit from the fluid path and removes the magnetic core. The metal debris falls under gravity from the non-magnetic sleeve and can be collected for disposal. The magnetic unit can then be re-positioned in the fluid flow path for further collection of the metal debris.

BRIEF DESCRIPTION OF THE DRAWINGS

Reference will now be made to the drawings wherein like parts are designated by like numerals and wherein.

DETAIL DESCRIPTION OF THE PREFERRED EMBODIMENT

Figure 1A:
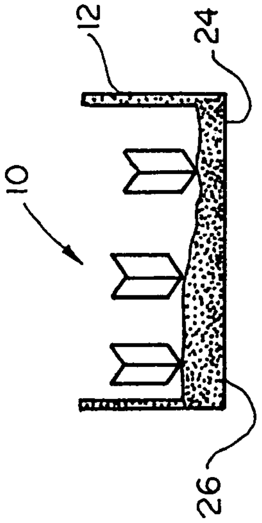
FIG. 1A is a schematic detail view of a re-circulated fluid line showing a plurality of fluid deflectors positioned therein.
Figure 1:
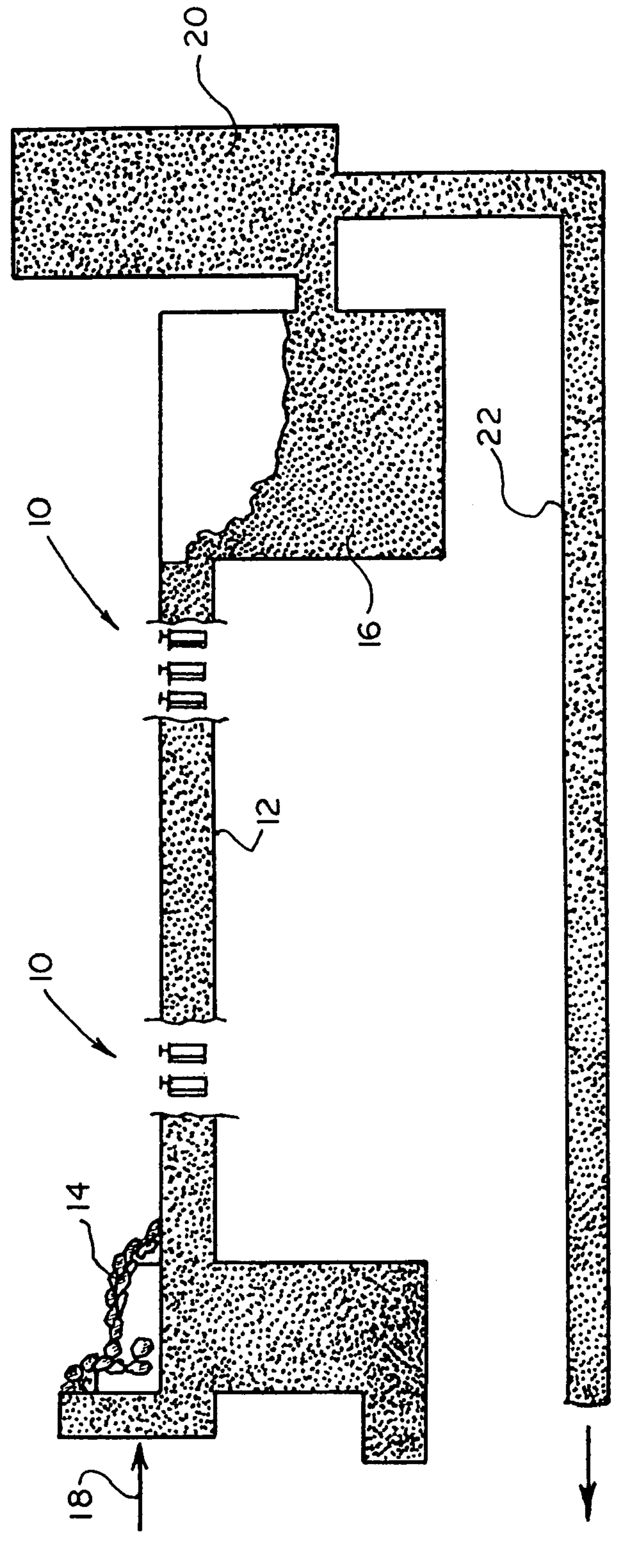
FIG. 1 is a schematic view illustrating circulation of fluid from and to a well bore.
Figures 2, 3, 4:
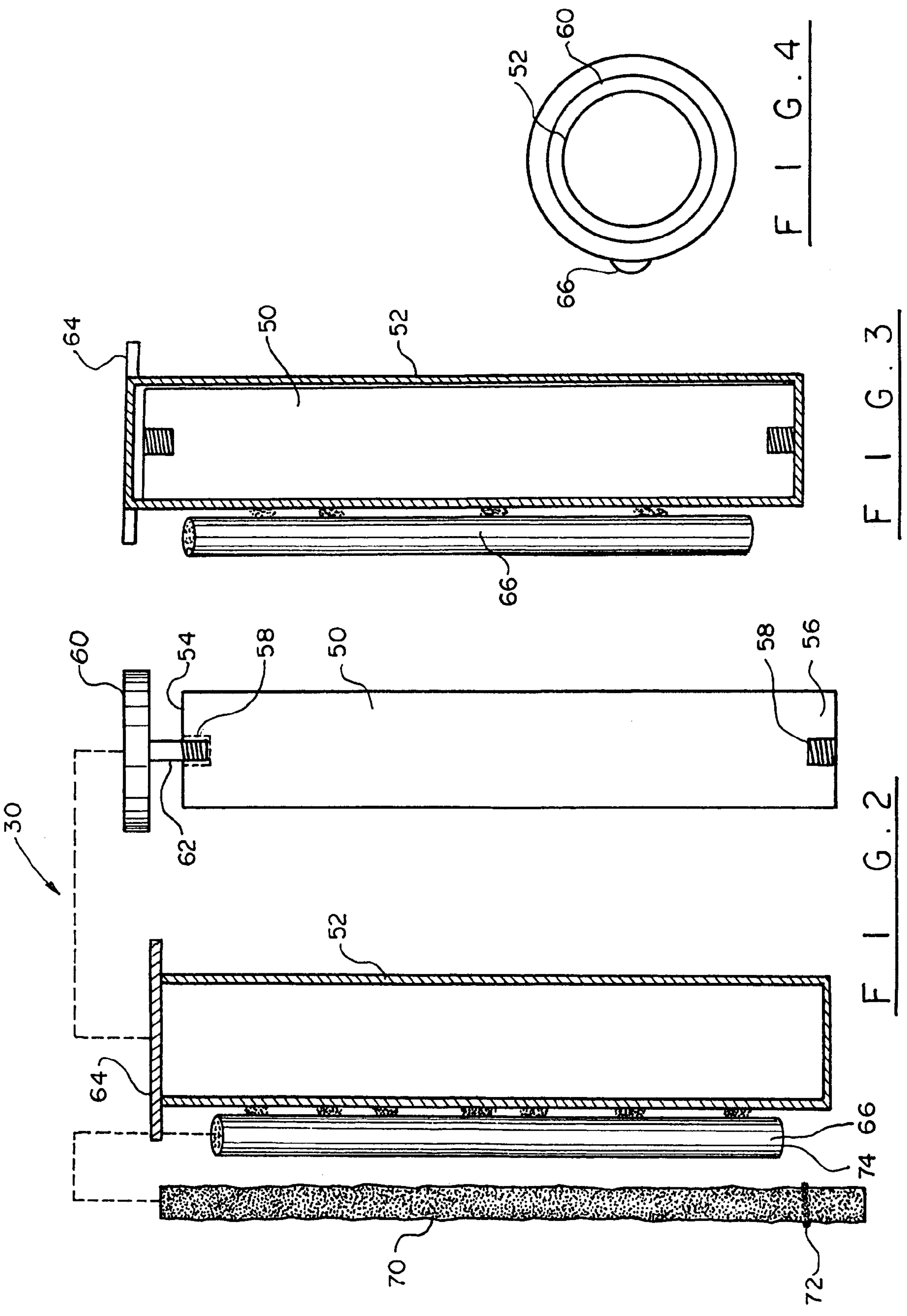
FIG. 2 is an exploded view of the cleanout magnetic unit in accordance to the present invention.
FIG. 3 is a detail view showing a magnetic core positioned in the non-magnetic sleeve.
FIG. 4 is a top view of the hollow sleeve with the magnetic core removed.
Figure 6:
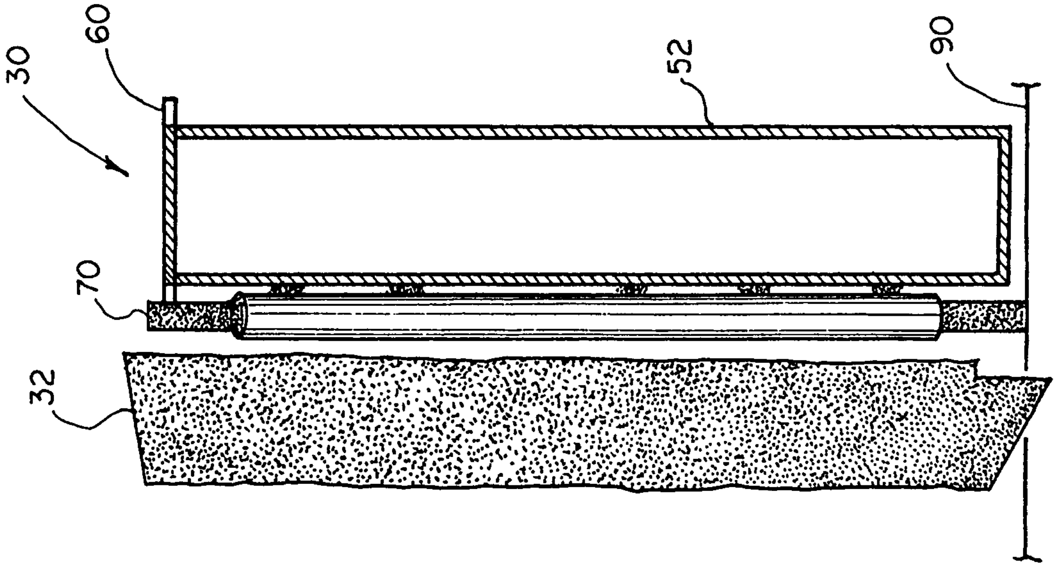
FIG. 6 is a side view illustrating the fluid deflector member and the magnetic unit of the present invention, with the handle removed.
Figure 5:
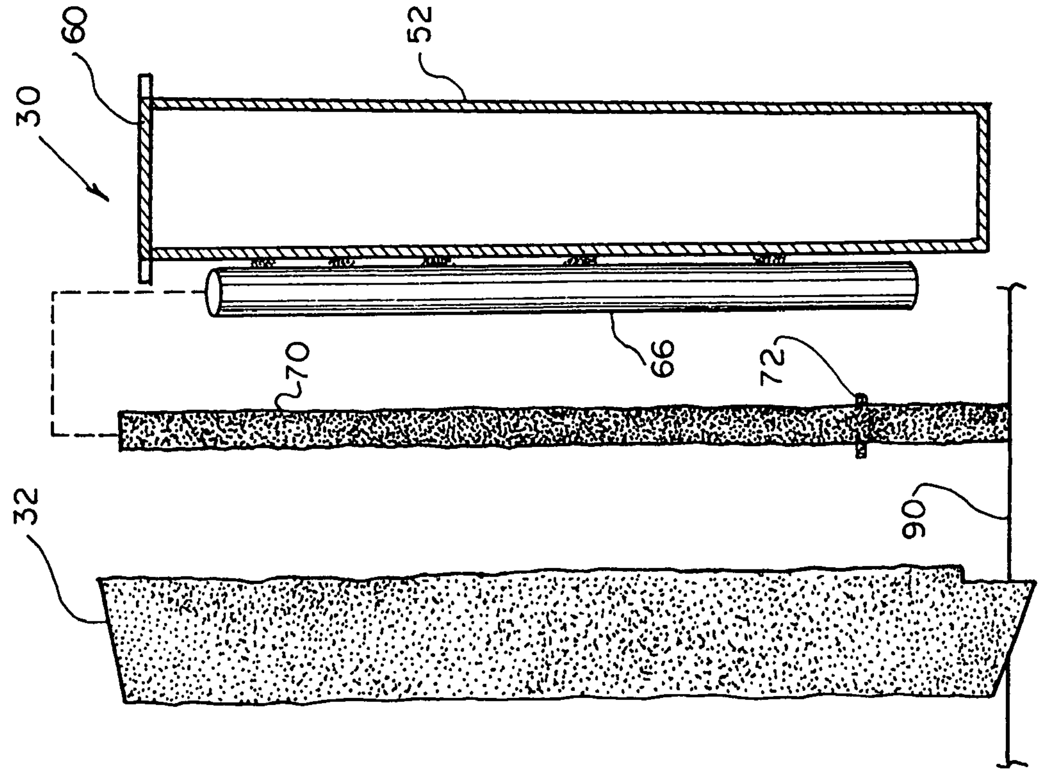
FIG. 5 is a detail view illustrating position of a fluid deflector member and a pivot shaft secured to a base plate.

Turning now to the drawings in more detail, numeral 10 designates the metal debris cleanout system in accordance with the present invention. As can be seen in FIG. 1, the system 10 can be positioned in one or more locations in a fluid return ditch 12, which extends between a surface cleanout device, for instance, a shale shaker 14 and a circulating fluid collection area, such as a mud pit 16. The circulating fluid, such as the drilling mud, is delivered to the shale shaker via a conduit 18 from a well bore (not shown). The shale shaker 14 typically comprises a screen through which chunks of formation, metal shavings and the like drop by gravity into a container positioned below the screen. The drilling mud or other re-circulated fluid, now free from relatively large pieces of debris, is allowed to flow to the fluid return ditch 12 that is slightly inclined to allow the fluid to flow to the mud pit 16 where heavier debris settles on the bottom, while lighter circulating fluid is pumped by one or more pumps 20 into a return line 22 for delivery to the rig floor (not shown). The cleanout system 10 of the present invention is positioned in the normal path of the fluid flow, such as re-circulating fluid line schematically shown in FIG. 1A. The re-circulated fluid 24 flows along the bottom 26 of the return ditch 12.

Each system 10 comprises a plurality of magnetic units 30, each provided with a corresponding fluid deflector member 32, which is positioned upstream from the magnetic unit 30. The fluid flow deflector member 32 comprises an upright solid body 34, which has outside dimensions preferably at least slightly greater than outside dimensions of the magnetic unit 30. The deflector member 30 has a generally-V-shaped cross section and is shown comprising a pair of angularly secured portions 36 and 38. The portions 36 and 38 may be connected together at an acute angle, at a right angle, or at an obtuse angle, depending on the particular design selected by the user. The deflector member re-directs the fluid flow and prevents a direct impact of the fluid on the protected magnetic unit 30. The pattern of the fluid flow is shown by arrows 31 in the drawings. As a result of positioning the deflector members 32 in the direct path of the fluid flow, the velocity of the flow is reduced and a plurality of turbulent areas are created on the edges of the deflector portions 36 and 38. At the same time, reduced velocity flow areas are created between the downstream sides 40, 42 of the deflector member 32. The deflector 32 redirects fluid movement and also creates an "Eddy" effect. This prevents flushing of the debris caught on the magnetic unit 30 under the strong force of the fluid flow. In addition the fluid deflector 32 creates a plurality of trap areas 44 allowing additional debris to be removed from the flow of the drilling fluid through the ditch 12. The magnetic tools 30 are positioned within the less turbulent zones, partially protected by the deflectors 32.

Each of the magnet assemblies 30 comprises a magnet insert, or core 50 configured for removable positioning within a hollow sleeve 52. The sleeve 52 is formed from a non-magnetic material, for instance, stainless steel, while the magnet insert 50 is made from rare earth materials. The insert 50 comprises an upper end 54 and a lower end 56, each provided with a cutout having interior threads 58. A handle 60 has a stem 62 provided with exterior threads matching the threads 58 on both ends of the insert 50. Should one of the threads 58 become damaged, the orientation of the insert 50 can be reversed, and the handle 60 can be engaged with either end of the magnetic insert 50.

A ring-shaped collar 64 is secured adjacent the top of the sleeve 52. The collar 64 has diameter greater than the exterior of the sleeve 52, the purpose of which will be explained in more detail hereinafter. As can be seen in the drawings, a pivot sleeve 66 is fixedly attached to the exterior of the hollow sleeve 52 and extends in a tangential relationship to the exterior surface of the sleeve 52. The pivot sleeve 66 is adapted for mounting over an upright pivot shaft 70. A pivot stop 72 is secured adjacent the lower part of the pivot shaft 70 transversely to a normal axis of the pivot shaft 70. The bottom 74 of the pivot sleeve 66 rests on the pivot stop 72 when the pivot sleeve 66 is engaged with the pivot shaft 70. When mounted on the pivot shaft 70, the hollow sleeve 52, along with the pivot sleeve 66, is allowed to pivot about a vertical axis defined by the shaft 70 in the directions shown by arrows 80 in the drawings, thereby forming a pivot member secured to an exterior of the hollow sleeve 52 that allows pivotal movement of the magnetic unit about a vertical axis under a force exerted by the fluid flow on said magnetic unit. The limited pivotal movement of the hollow sleeve 52 allows the magnetic field created by the magnet insert 50 to span along a greater area within the fluid flow and collect more metal debris. The core 50 and the sleeve 52 are designed to swing with the prevailing drill fluid current, allowing the magnets to adjust to a comfortable position within the fluid flow to maximize the debris collection process.

The pivot shaft 70 and the fluid deflectors 32 are fixedly secured on a base plate 90 which supports one or more fluid deflectors 32 and one or more pivot shafts 70 thereon. The sleeves 52, 66 and with the magnet inserts 50 can be easily removed from the base plate 90 when necessary during operation of the instant system.

Figure 14:
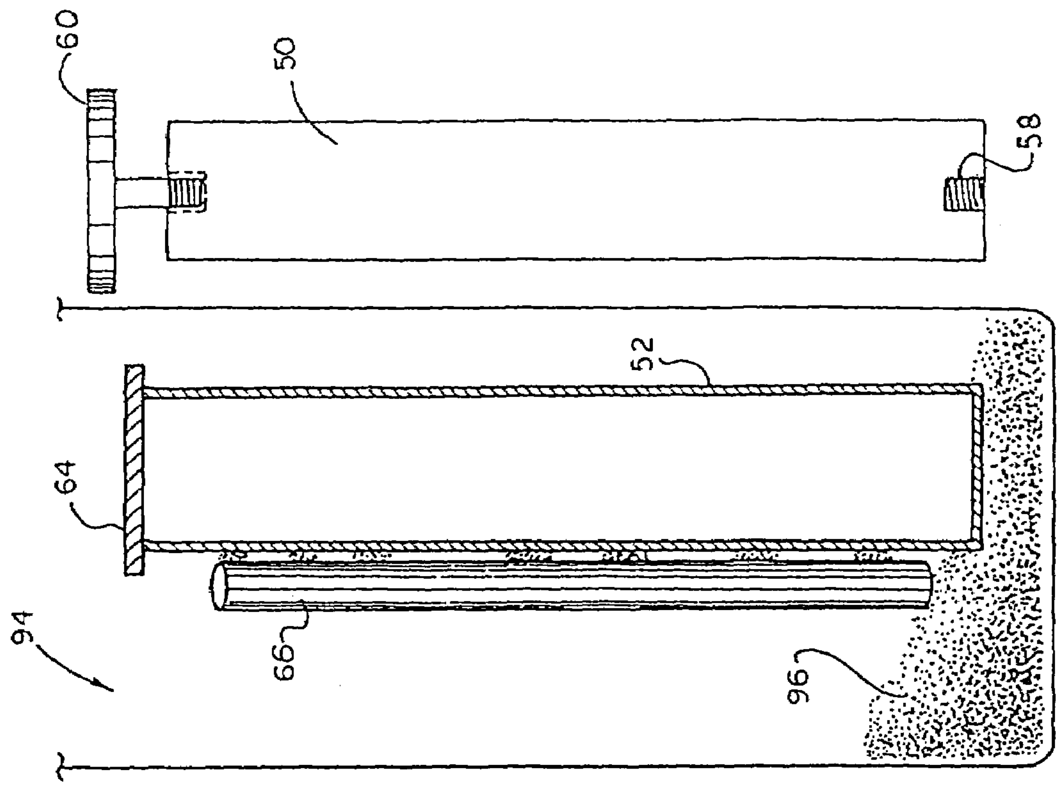
FIG. 14 illustrates easy removal of the metal debris from the hollow sleeve upon removal of the magnetic core.
Figure 13:
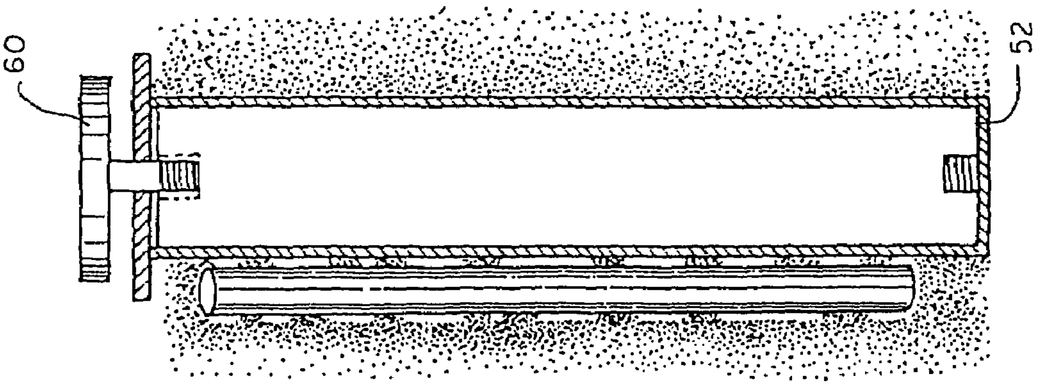
FIG. 13 illustrates a magnetic unit with the metal debris settled on the hollow sleeve.
Figure 7:
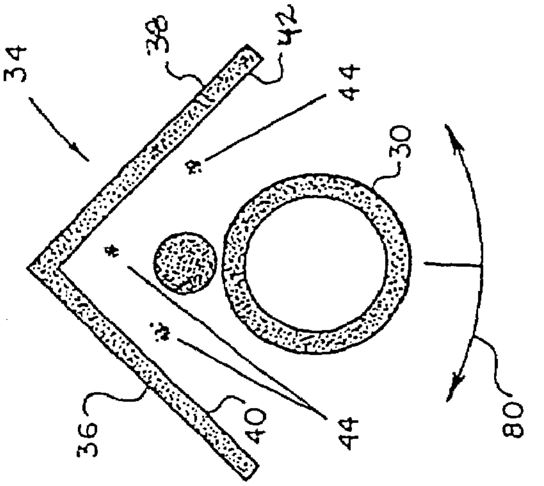
FIG. 7 is a schematic view illustrating position of the fluid deflector member relative to the magnetic unit such that a trap area is formed therebetween.
Figure 8:
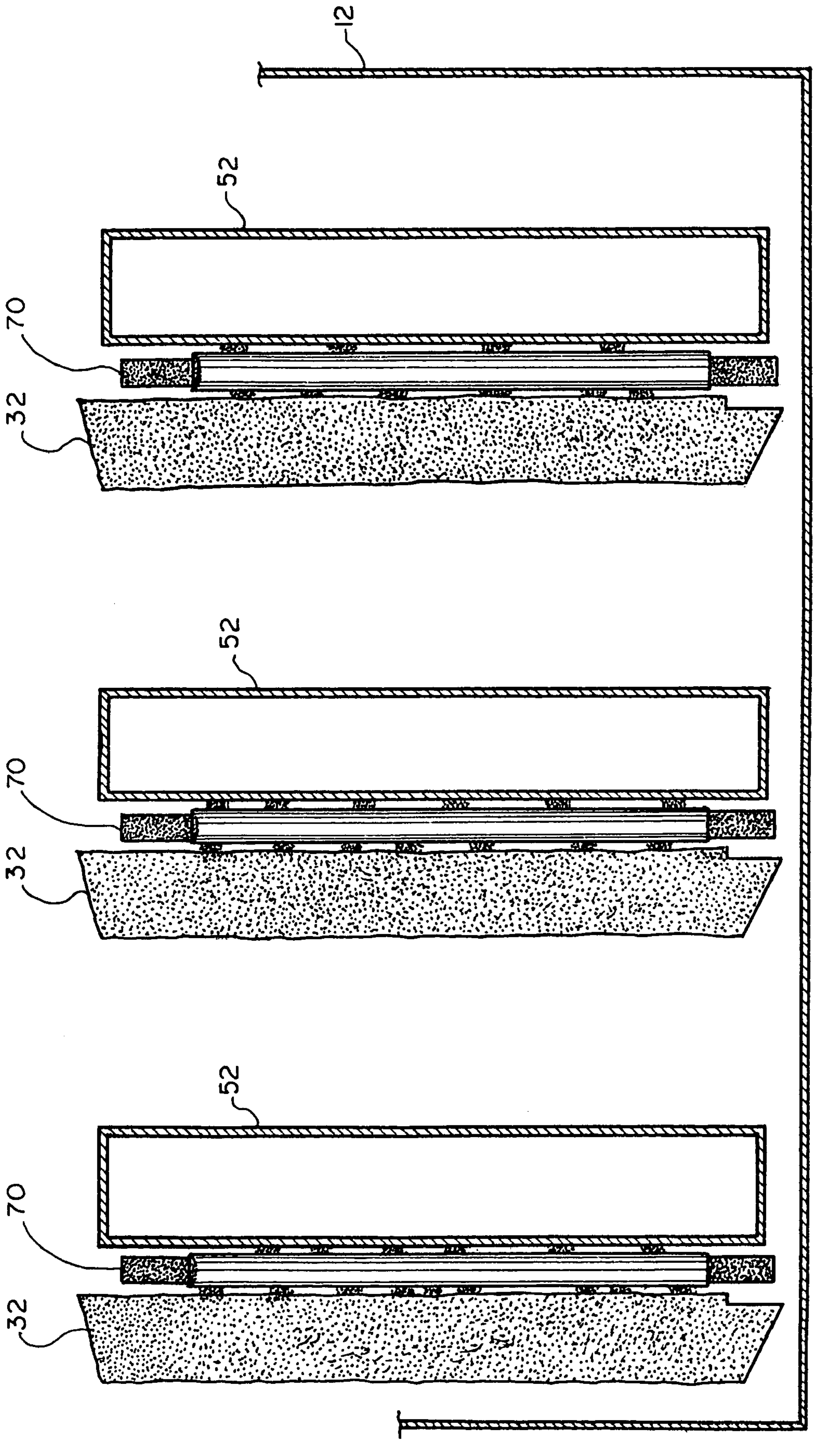
FIG. 8 is a schematic side view illustrating position of the plurality of magnetic unit and fluid deflector member in a fluid return ditch.
Figure 10:
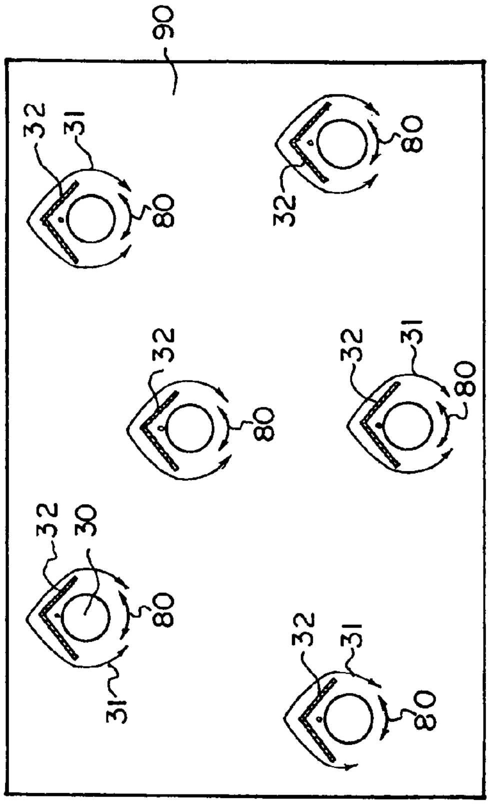
FIG. 10 is a schematic view illustrating positioning of the magnetic tool units using a different positioning choice of the magnetic units on the base plate.
Figure 12:
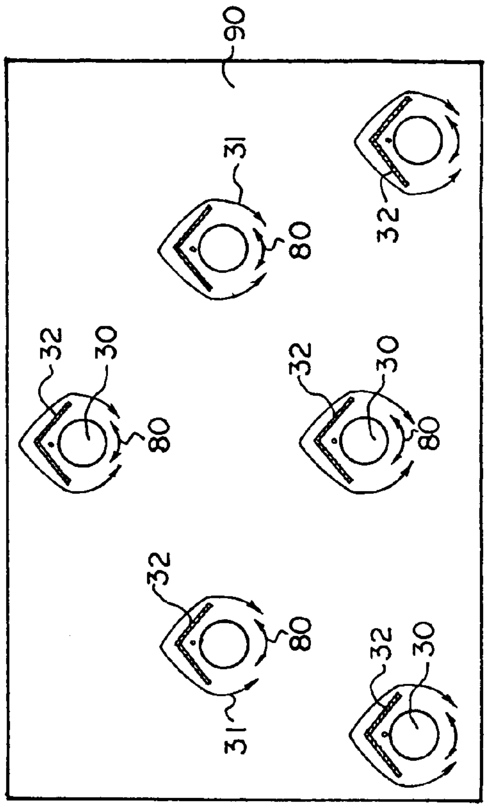
FIG. 12 is a schematic view illustrating still further variation in the magnetic unit placement in the return ditch.
Figure 9:
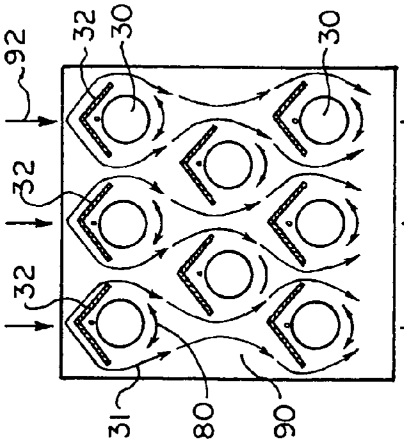
FIG. 9 is a schematic top view illustrating the cleanout system of the present invention utilizing a plurality of magnetic tool units positioned within a fluid return ditch.
Figure 11:
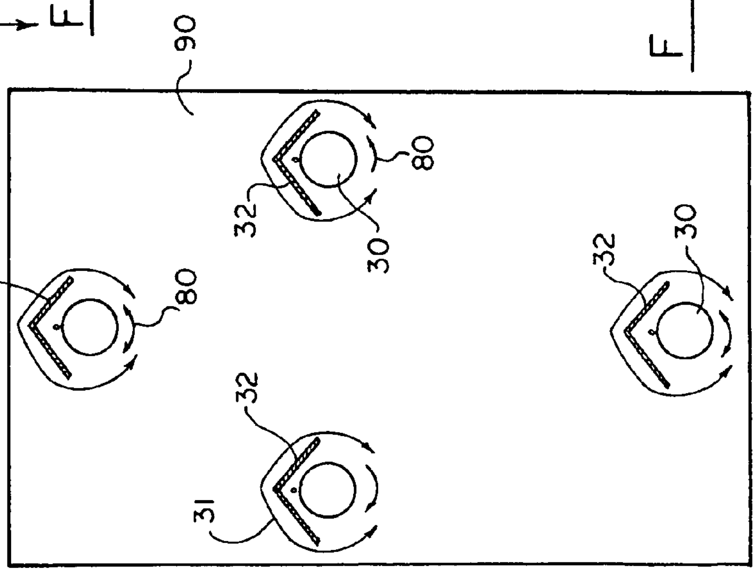
FIG. 11 is a schematic view illustrating still another variation in the magnetic units placement.

In operation, the user positions the base plate 90 with a cleanout magnetic tool in the normal fluid path of the recirculated fluid, such as for instance ditch 12. The base plate 90 rests on the bottom with the magnetic units 30 and the deflector members 32 extending upwardly, as shown schematically in FIG. 1. The fluid flow is allowed to flow past the magnetic unit, in the direction shown by arrows 92 in FIG. 9, moving around the deflector members 32, while the magnetic core attracts the metal debris from the fluid flow and causes it to settle on the exterior of the hollow sleeve 52 and the pivot sleeve 66. The operator monitors the accumulation of metal particles and, once it is determined that the amount of metal debris attracted is approaching a critical limit, the operator slides the pivot sleeve 66 from the pivot shaft 70 and removes the sleeves 52, 66, along with the magnetic core 50 from the base plate 90. The unit 30 is then positioned in a container schematically designated by numeral 94 in FIG. 14, which is large enough to accommodate the unit 30. The operator then removes the core 50 by lifting it by the handle 60. Once the magnetic core 52 is removed, the magnetic field ceases to act on the metal debris 96 and it falls under gravity to the bottom of the container 94. The ring collar 64 prevents the debris 96 from following the movement of the magnetic field generated by the insert 50 and stops the metal debris 96 from moving beyond the limits defined by the ring 64. Once the sleeves 52 and 66 are free from the debris, the sleeves 52, 66 are lifted from the container 94, the magnetic insert 50 is reinserted into the sleeve 52 and the unit is ready for positioning on the pivot shaft 70 again. The debris 96 can be recovered in the container and analyzed at the operator's convenience or disposed of in an environmentally safe manner.

The present invention provides an efficient and easy to operate metal debris removal system and method. In comparison with conventional methods of metal debris removal, which is time consuming and labor intensive, the removable magnet insert allows to safely and easily remove the accumulated metal from the outside of the sleeve and immediately reuse the unit without the need for complex cleanup by pressure washing, scraping and other such means that are currently used in the industry.

Many changes and modifications can be made in the design of the present invention without departing from the spirit thereof. I, therefore, pray that my rights to the present invention be limited only by the scope of the appended claims.

I claim:

1. A cleanout system for removal of metal debris from a fluid flow, the system comprising at least one magnetic unit configured for positioning in a path of the fluid, said at least one magnetic unit comprising a hollow sleeve, a removable magnetic core configured for positioning in said hollow sleeve, an exterior surface of said hollow sleeve forming a metal debris settling area, said hollow sleeve being secured to a pivot member, said pivot member allowing pivotal movement of the magnetic unit about a vertical axis under a force exerted by the fluid flow on said magnetic unit.

2. The system of claim 1, wherein said system further comprises at least one fluid deflector member positioned in a spaced-apart relationship upstream of said at least one magnetic unit, said fluid deflector member modifying the fluid flow adjacent said at least one magnetic tool unit.

3. The system of claim 2, wherein said at least one fluid deflector member comprises a solid body extending transversely to a normal fluid flow.

4. The system of claim 3, wherein said solid body has a generally V-shaped cross-section, said body having cross-sectional dimensions at least slightly greater than cross sections dimensions of said at least one magnetic unit.

5. The system of claim 2, wherein said at least one fluid deflector member is positioned a distance from said at least one magnetic unit, such that a trap area for metal debris is created between said least one fluid deflector member and said at least one magnetic unit.

6. The system of claim 1, wherein said at least one magnetic unit is adapted for pivotal movement about a vertical axis.

7. The system of claim 2, wherein said at least one magnetic unit further comprises an upright shaft and a pivot sleeve detachably pivotally mountable on said shaft, said pivot sleeve being attached to said hollow sleeve.

8. The system of claim 7, further comprising a base plate, and where said fluid deflector member and said upright shaft are secured on said base.

9. A cleanout system for removal of metal debris from a well bore re-circulating fluid, the system comprising:

a base plate;

a plurality of magnetic units configured for positioning in a path of re-circulating fluid, each of said magnetic units comprising a non-magnetic hollow sleeve and a removable magnetic core configured for positioning in said sleeve, an exterior surface of said hollow sleeve forming a metal debris settling area, said hollow sleeve being secured to a pivot member, said pivot member allowing pivotal movement of the magnetic unit about a vertical axis under a force exerted by the fluid flow on said magnetic unit; and a fluid deflector member positioned upstream of and in a spaced-apart relationship to, each of said magnetic units for deflecting direct impact of the re-circulating fluid on a respective magnetic unit.

10. The system of claim 9, wherein each of said fluid deflector members comprises a generally V-shaped solid body extending transversely to a normal fluid flow of the re-circulating fluid, said fluid deflector member creating a metal debris trap area between the fluid deflector member and the respective magnetic unit.

11. The system of claim 9, wherein each of said magnetic units further comprises an upright shaft and a pivot sleeve detachably pivotally mountable on said shaft, said pivot sleeve being attached to said hollow sleeve, and said upright shaft being fixedly secured on said base plate.

* * * * *